United States Patent
Watanabe

(10) Patent No.: US 9,016,826 B2
(45) Date of Patent: Apr. 28, 2015

(54) MEDIA PROCESSING DEVICE AND METHOD OF CONTROLLING A MEDIA PROCESSING DEVICE

(71) Applicant: Seiko Epson Corporation, Tokyo (JP)

(72) Inventor: Kei Watanabe, Saku (JP)

(73) Assignee: Seiko Epson Corporation, Tokyo (JP)

( * ) Notice: Subject to any disclaimer, the term of this patent is extended or adjusted under 35 U.S.C. 154(b) by 155 days.

(21) Appl. No.: 13/621,369

(22) Filed: Sep. 17, 2012

(65) Prior Publication Data

US 2013/0076816 A1    Mar. 28, 2013

(30) Foreign Application Priority Data

Sep. 15, 2011   (JP) .................................. 2011-201881

(51) Int. Cl.
*B41J 29/38*    (2006.01)
*G06Q 20/04*    (2012.01)
*G06K 17/00*    (2006.01)
*B41J 3/44*    (2006.01)

(52) U.S. Cl.
CPC .............. *B41J 29/38* (2013.01); *G06Q 20/042* (2013.01); *G06K 17/00* (2013.01); *G06K 2017/0038* (2013.01); *B41J 3/44* (2013.01)

(58) Field of Classification Search
USPC .................................... 347/5, 7, 9, 16, 12, 19
See application file for complete search history.

(56) References Cited

U.S. PATENT DOCUMENTS

| | | | |
|---|---|---|---|
| 7,971,954 B2 * | 7/2011 | Ito ................................... | 347/16 |
| 2008/0266336 A1 * | 10/2008 | Maru et al. ........................ | 347/7 |

FOREIGN PATENT DOCUMENTS

| | | |
|---|---|---|
| JP | 2002-255393 A | 9/2002 |
| JP | 2009-249045 A | 10/2009 |

* cited by examiner

*Primary Examiner* — Lam Nguyen
(74) *Attorney, Agent, or Firm* — Nutter McClennen & Fish LLP; John J. Penny, Jr.; Joshua I. Rudawitz

(57) ABSTRACT

A media processing device includes a reception unit that receives commands; a conveyance unit that conveys media; a reading unit that reads information from the media conveyed by the conveyance unit; a recording unit that records on the media conveyed by the conveyance unit; and an initialization process execution unit that, after the media processing device turns on or resets, enters a busy state in which the reception unit does not receive commands, executes a first initialization process that runs a process confirming media conveyance by the conveyance unit, and then cancels the busy state and runs a second initialization process that initializes the recording unit or the reading unit.

7 Claims, 6 Drawing Sheets

MEDIA PROCESSING DEVICE AND METHOD OF CONTROLLING A MEDIA PROCESSING DEVICE

BACKGROUND

1. Technical Field

The present invention relates to a media processing device that can connect to a control device, a method of controlling the media processing device, and a program for controlling the media processing device.

2. Related Art

Media processing devices that convey media such as checks, read magnetic ink characters recorded on the checks and record images on the checks while the checks are being conveyed, are known from the literature. See, for example, Japanese Unexamined Patent Appl. Pub. JP-A-2002-255393.

Media processing devices of this type that can connect to a host computer or other control device and communicate with the control device as required are also known. Media processing devices that are connected to a control device generally stop receiving commands from the control device after the power turns on or a reset, execute all preset initialization processes, and then cancel stopping receiving commands from the control device after the initialization processes are completed and all operations related to media processing can be executed normally again.

Control of the media processing device by the control device is therefore not possible during the period in which receiving commands from the control device is stopped after the power turns on or the device resets. Shortening this period as much as possible is therefore necessary.

On the other hand, because resolving the error is more important than starting media processing until the error is corrected when an error related to media processing occurs after the power turns on or the device resets, stopping receipt of commands from the control device until the error is resolved after an error occurs is also desirable.

SUMMARY

With consideration for the foregoing problem, the present invention blocks receiving commands from the control device until confirming that there are no errors related to media processing while minimizing the time for which commands from the control device are not received after the power turns on or the device resets.

One aspect of the invention is a media processing device including a reception unit that receives commands; a conveyance unit that conveys media; a reading unit that reads information from the media conveyed by the conveyance unit; a recording unit that records on the media conveyed by the conveyance unit; and an initialization process execution unit that, after the media processing device turns on or resets, enters a busy state in which the reception unit does not receive commands, executes a first initialization process that runs a process confirming media conveyance by the conveyance unit, and then cancels the busy state and runs a second initialization process that initializes the recording unit or the reading unit.

If media cannot be conveyed normally by the conveyance unit after the media processing device turns on or resets because media remains in the media conveyance path or there is an error with the conveyance mechanism, the conveyance operation that is essential to media processing, including reading media information and recording on the media, is not possible. Media can therefore not be processed in any way, and the error must be resolved immediately without starting to receive commands from the control device.

However, errors related to the reading unit or the recording unit can also occur while media can be normally conveyed by the conveyance unit. This includes cases in which prompt correction of the error is not necessary, such as when the user knows and does not mind that media information cannot be read with the reading unit, or knows and does not mind that images cannot be recorded with the recording unit. In such cases, receiving commands from the control device and processing commands that can be processed is possible.

The initialization process that must be run after device power turns on or a reset is thus divided in two to a first initialization process and a second initialization process, the busy state is cancelled after at least confirming in the first initialization process that the conveyance unit can normally convey media, and the remaining initialization processes are run in the second initialization process. As a result, the period during which commands are not received from the control device after the power turns on or a reset can be shortened as much as possible after desirably preventing receiving commands from the control device until confirming that media can be conveyed normally by the conveyance unit and there are no errors related to media processing.

In a media processing device according to another aspect of the invention, the recording unit records on the media with an inkjet head; and the recording unit initialization operation of the second initialization process is a process related to preparing the inkjet head for ink ejection.

Because the process that prepares for ejecting ink by the inkjet head is an initialization process that is required to ensure that images can be recorded normally, receiving a command from the control device before the process is completed will not directly create a problem. However, because this process involves operating the inkjet head and other physical mechanisms, a relatively long time is required from beginning to end.

By running the process that prepares for ejecting ink by the inkjet head as a second initialization process after cancelling the busy state, this aspect of the invention can shorten the time for which commands are not received from the control device after a reset or the power turns on as much as possible.

In a media processing device according to another aspect of the invention, the process related to preparing the inkjet head for ink ejection is a process related to suctioning ink from the cap of the inkjet head.

Because not suctioning remaining ink from the cap after the power turns on or a reset can result in ink overflowing the cap, the process related to suctioning ink from the inkjet head cap is required after the media processing device turns on or resets, but requires a relatively long time because it involves moving the inkjet head and driving a pump.

By running the process related to suctioning ink from the cap of the inkjet head as a second initialization process after cancelling the busy state, this aspect of the invention can minimize the time for which commands are not received from the control device after the power turns on or a reset.

In a media processing device according to another aspect of the invention, after cancelling the busy state, a process related to the reception unit receiving the commands is executed while the initialization process execution unit runs the second initialization process.

This aspect of the invention improves processing efficiency by being able to run the second initialization process and the process related to receiving commands in parallel.

Another aspect of the invention is a method of controlling a media processing device including steps of: turning media processing device power on or resetting the media processing device; entering a busy state in which the reception unit does not receive commands; executing a first initialization process that confirms media conveyance by a conveyance unit that conveys media; canceling the busy state after running the first initialization process; and running a second initialization process that initializes a recording unit that records on the media or a reading unit that reads information from the media.

The initialization process that must be run after device power turns on or a reset is thus divided into a first initialization process and a second initialization process, the busy state is cancelled after at least confirming in the first initialization process that the conveyance unit can normally convey media, and the remaining initialization processes are run in the second initialization process. As a result, the period during which commands are not received from the control device after the power turns on or a reset can be minimized after desirably preventing receiving commands from the control device until confirming that media can be conveyed normally by the conveyance unit and there are no errors related to media processing.

Another aspect of the invention is a program run by a control unit that controls a media processing device that is connected to a control device and has a reception unit that receives commands, a conveyance unit that conveys media, a reading unit that reads information from the media conveyed by the conveyance unit, a recording unit that records on the media conveyed by the conveyance unit, and causes the control unit to function as an initialization process execution unit that of ter the media processing device turns on or resets, enters a busy state in which commands are not received from the control device, executes a first initialization process that confirms media conveyance by the conveyance unit, and then cancels the busy state and runs a second initialization process that initializes the recording unit or the reading unit.

By running the program according to this aspect of the invention, the initialization process that must be run after device power turns on or a reset is divided into a first initialization process and a second initialization process, the busy state is cancelled after at least confirming in the first initialization process that the conveyance unit can normally convey media, and the remaining initialization processes are run in the second initialization process. As a result, the period during which commands are not received from the control device after the power turns on or a reset can be shortened as much as possible after desirably preventing receiving commands from the control device until confirming that media can be conveyed normally by the conveyance unit and there are no errors related to media processing.

The invention can prevent receiving commands from a control device until confirming there are no errors that prevent starting media processing, and minimize the time that communication between the media processing device and control device is interrupted after device power turns on or a reset.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
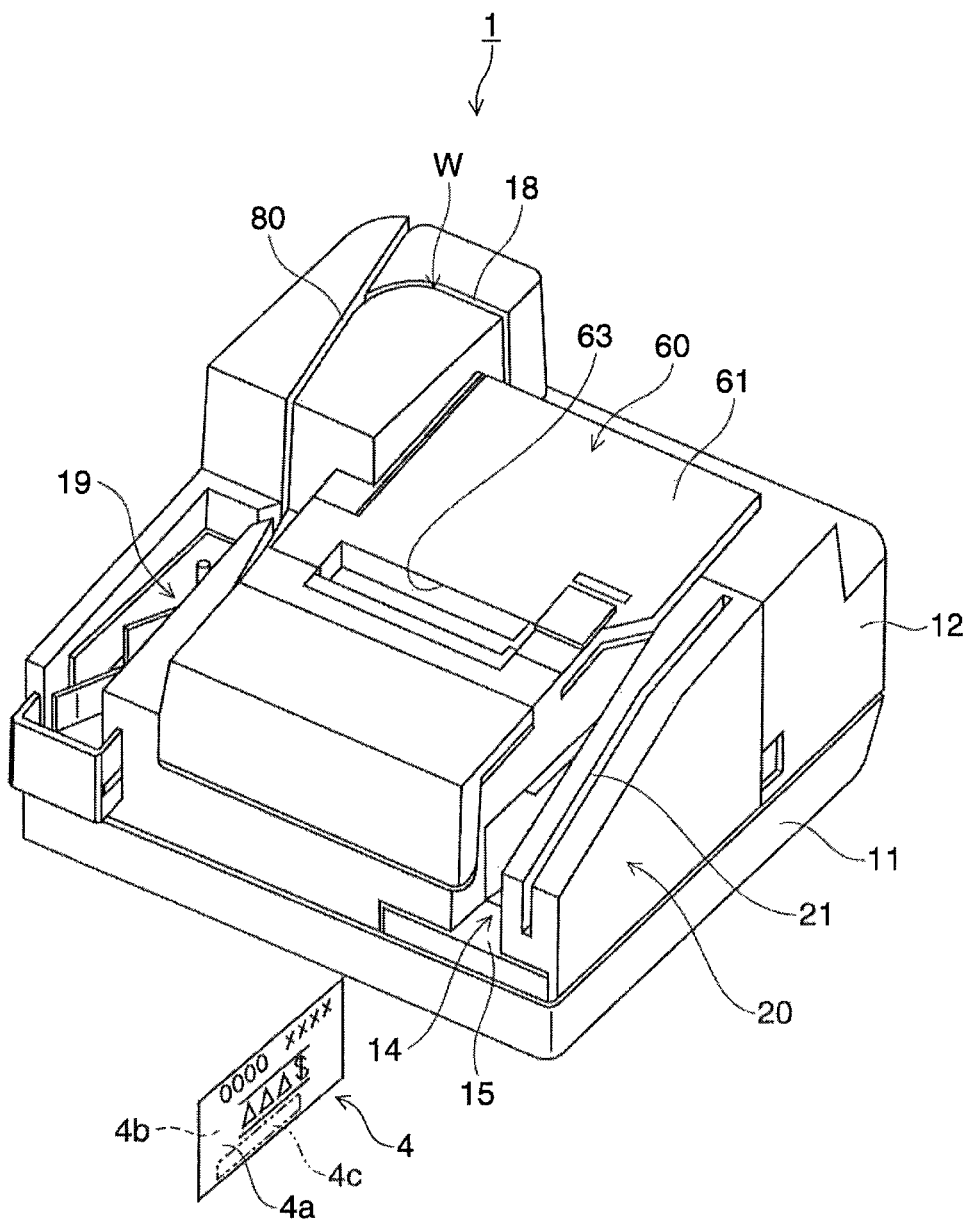
FIG. 1 is an external oblique view of a multifunction device.

FIG. 1 is an oblique view of a multifunction device 1 according to this embodiment of the invention.

The multifunction device 1 is a device that can process media such as checks 4 and other forms (referred to herein as "processed media") in multiple ways, including reading magnetic ink characters printed on the processed medium, optically imaging (scanning) both sides of the processed medium, and recording (printing) images including text on the processed medium. The multifunction device 1 also functions as a card reader that reads magnetic information recorded on card media such as credit cards, and functions to produce specific types of tickets with an image recorded thereon by recording an image to thermal roll paper and cutting the paper.

This embodiment of the invention describes processing checks 4 as an example of the processed medium. As shown in FIG. 1, a check 4 is a form having a payment amount, payee, serial number, payer signature, and other information printed on a sheet (paper) with a specific colored or patterned background. The payment amount, payee, serial number, payer signature, and other information are printed on the face 4a, and an endorsement area is provided on the back 4b. An endorsement is printed with specific text or an image in the endorsement area by the inkjet head 10 described below. An MICR (magnetic ink character recognition) line 4c is preprinted along the length of the check 4 on the face 4a. The MICR line 4c is a line of magnetic ink characters printed with magnetic ink, and can be read magnetically and optically. The lengths of the short and long sides of a check 4 are standardized, but can be of various different sizes because there are different standards. The multifunction device 1 according to this embodiment of the invention defines a maximum check size that includes substantially all commonly used sizes of checks 4, and can process any check 4 within this maximum size.

The outside case of the multifunction device 1 includes a bottom case 11 that covers the bottom part of the multifunction device 1, and a cover 12 that covers the bottom case 11, and the main unit 13 of the multifunction device 1 is housed inside this outside case. An entrance 14 for inserting checks 4 is open at the front of the multifunction device 1, and a stacker 15 that can hold a stack of plural checks 4 is provided inside the entrance 14. The stacker 15 can be pulled out to the front, and the checks 4 can be loaded into the stacker 15 after adjusting the stacker 15 to the size of the checks 4 to be stored in the stacker 15.

A slot 18 that is substantially U-shaped when seen from above and is used as the conveyance path W of the checks 4 is formed in the cover 12, and the slot 18 ends in an exit pocket 19 at the front of the multifunction device 1. Checks 4 stored in the stacker 15 are fed one by one into the multifunction device 1 as described below, are processed as they pass through the slot 18, and the processed checks 4 are discharged into the exit pocket 19. Multiple checks 4 can accumulate in the exit pocket 19.

As shown in FIG. 1, a magnetic card reader 20 is disposed beside the stacker 15. The magnetic card reader 20 includes a card slot 21 formed in the cover 12, and a MCR (magnetic card reader) head 22 (FIG. 3) disposed facing the card slot 21, and reads information magnetically recorded on cards passing through the card slot 21 with the MCR head 22.

Figure 2:
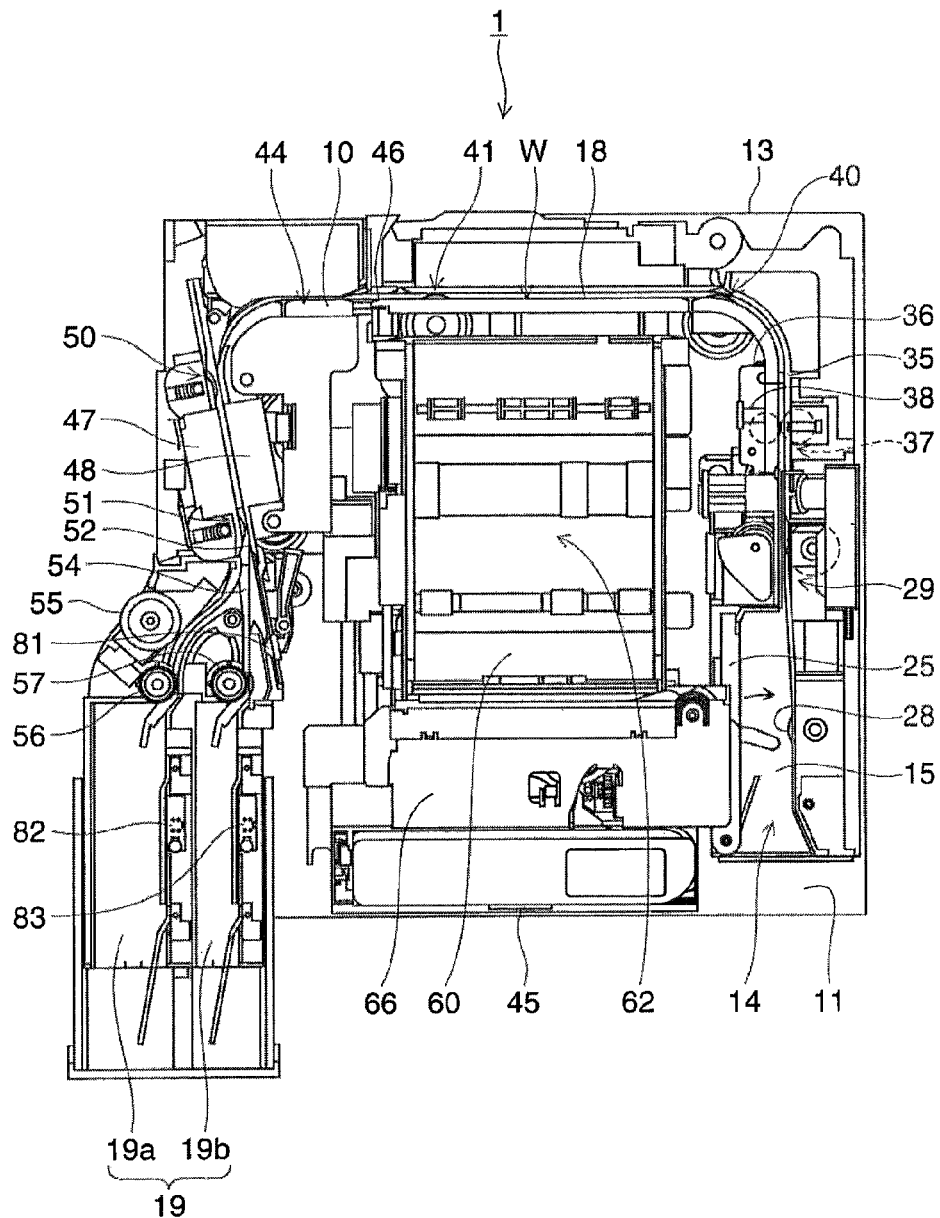
FIG. 2 shows the internal configuration of the multifunction device.

FIG. 2 is a plan view showing the configuration of the main unit 13 of the multifunction device 1 housed the outside case. A hopper 25 is disposed on one side of the stacker 15. The hopper 25 can pivot in the direction of the arrow by means of a hopper drive motor 26 (FIG. 3), and pushes the checks 4 in the stacker 15 to the other side.

A pickup roller 28 driven by an ASF (automatic sheet feeder) motor 27 (FIG. 3) described below is disposed on the other side of the stacker 15, and when the hopper 25 rotates toward the pickup roller 28, one check 4 in the stacker 15 is urged by the rotating hopper 25 to the pickup roller 28, contacts the roller, and is fed into the conveyance path W by rotation of the pickup roller 28.

An ASF roller set 29 composed of a pair of rollers is disposed downstream from the stacker 15. The two rollers of the ASF roller set 29 are disposed on opposite sides of the conveyance path W, one roller is driven by the ASF motor 27, and the other roller is a follower roller. The check 4 in contact with the pickup roller 28 is nipped by the ASF roller set 29, and conveyed downstream through the slot 18.

An ASF paper detector 31 (FIG. 3) is disposed to a specific position in the stacker 15. The ASF paper detector 31 is a transmission photo sensor in this embodiment, and detects if a check 4 is in the stacker 15.

A hopper position detector 32 (FIG. 3) is disposed at the standby position of the hopper 25 in the stacker 15. The hopper position detector 32 is a transmission photo sensor in this embodiment, and detects if the hopper 25 is in the standby position.

A MICR (magnetic ink character recognition) head 35 that contacts the face 4a of the check 4 and magnetically reads the MICR line 4c (FIG. 1) is disposed downstream from the ASF roller set 29. A MICR roller 36 is disposed opposite the MICR head 35. The MICR roller 36 is pushed to the MICR head 35 side, rotates while pressing the check 4 against the MICR head 35, and conveys checks 4 at a constant speed suited to reading the MICR line. An assist roller set 37 composed of a pair of rollers that guide the check 4 fed by the ASF roller set 29 to the MICR head 35 is disposed on the upstream side of the MICR head 35.

A paper length detector 38 is disposed to the conveyance path W between the assist roller set 37 and MICR head 35. The paper length detector 38 is a reflective photo sensor in this embodiment, and detects the leading end and trailing end of each check 4 by detecting if a check 4 passing through the conveyance path W is at the detection position. The control unit 70 acquires the output signals of the paper length detector 38 and determines the length of the check 4 based on change in detector output.

A first conveyance roller set 40 including a pair of rollers disposed on opposite sides of the conveyance path W is disposed to the conveyance path W on the downstream side of the MICR head 35, and a second conveyance roller set 41 is disposed downstream from the first conveyance roller set 40. The first conveyance roller set 40 and second conveyance roller set 41 are driven rotationally by a conveyance motor 42 (FIG. 3), and these rollers convey the check 4 to the inkjet printer unit 44.

The inkjet printer unit 44 has an inkjet head 10. The inkjet head 10 is an inkjet recording head that is supplied with ink from an ink cartridge 45 installed in the front part of the main unit 13 and ejects ink onto the check 4. The inkjet head 10 in this embodiment prints an endorsement including text or symbols on the back 4b of the check 4.

The inkjet head 10 can be capped with a cap not shown, and can be cleaned and wiped with a wiper. A wiper position detector 86 (FIG. 3) that includes a micro switch and detects if the wiper is set to a specific standby position is disposed to a position appropriate to the position where the wiper is disposed. An inkjet head thermistor 85 (FIG. 3) is disposed to the inkjet head 10 to detect abnormal head temperatures.

An intermediate detector 46 is disposed between the inkjet head 10 and second conveyance roller set 41. The intermediate detector 46 is a reflective photo sensor in this embodiment, and detects if a check 4 is at the detection position.

A CIS (contact image sensor) unit for optically reading checks 4 is disposed downstream from the inkjet head 10. This CIS unit includes a front CIS unit 47 for imaging the face 4a of the check 4, and a back CIS unit 48 for imaging the back 4b, and can thus optically image both sides of each check 4. The front CIS unit 47 and back CIS unit 48 are disposed on opposite sides of the conveyance path W. A first CIS roller 50 is disposed on the upstream side and a second CIS roller 51 is disposed on the downstream side of these units. The first CIS roller 50 and second CIS roller 51 are rollers that are driven rotationally by the conveyance motor 42, and checks 4 are conveyed by these rollers at a constant speed while being imaged by the CIS units.

A discharge detector 52 is located downstream from the second CIS roller 51. The discharge detector 52 is a reflective photo sensor in this embodiment, and detects if a check 4 is at the detection position.

A card slot 80 is also formed in the back part of the multifunction device 1 at a position appropriate to the CIS unit as shown in FIG. 1. This card slot 80 is for conveying card media such as driver licenses and identification cards for scanning with the CIS unit. The multifunction device 1 according to this embodiment of the invention can also separately scan card media using the card slot 80, and is not limited to scanning checks 4 conveyed through the conveyance path W. As shown in FIG. 2, a card detector 81 for detecting if media is in the card slot 80 is disposed to a position at the front end part of the card slot 80.

The exit pocket 19 described above is located downstream from the front CIS unit 47 and back CIS unit 48. The exit pocket 19 is divided into a main pocket 19a and a sub-pocket 19b, and the slot 18 splits and is connected to both the main pocket 19a and sub-pocket 19b. The main pocket 19a and sub-pocket 19b can each hold a plurality of checks 4.

A main pocket near-full detector 82 is disposed to the main pocket 19a. This main pocket near-full detector 82 is a sensor that detects if the main pocket 19a is nearly full, and could be a transmission photo sensor, for example.

A sub-pocket near-full detector 83 is disposed to the sub-pocket 19b. This sub-pocket near-full detector 83 is a sensor that detects if the sub-pocket 19b is nearly full, and could be a transmission photo sensor, for example.

A flapper 54 that switches the exit pocket 19 into which the check 4 is discharged to the main pocket 19a or sub-pocket 19b is disposed at the position where the slot 18 splits. The flapper 54 is a guide that by closing the path to the main pocket 19a or the path to the sub-pocket 19b guides the check 4 into the other pocket, and is driven by the flapper drive motor 55. A flapper detector 84 (FIG. 3) is disposed at a specific position relative to the flapper 54. The flapper detector 84 could be a transmission photo sensor, for example, and detects if the flapper 54 is at a specific standby position.

A discharge roller 56 is disposed to the path from the flapper 54 to the main pocket 19a, another discharge roller 57 is disposed to the path from the flapper 54 to the sub-pocket 19b, and the checks 4 are thus smoothly discharged by these rollers and guided by the flapper 54 into the appropriate exit pocket 19.

As described below, the multifunction device 1 discharges the check 4 into the main pocket 19a when the check 4 is determined to have been correctly loaded based on the result of the MICR head 35 reading the MICR line 4c, and into the sub-pocket 19b when the check 4 is determined to have not been correctly loaded.

Figure 3:
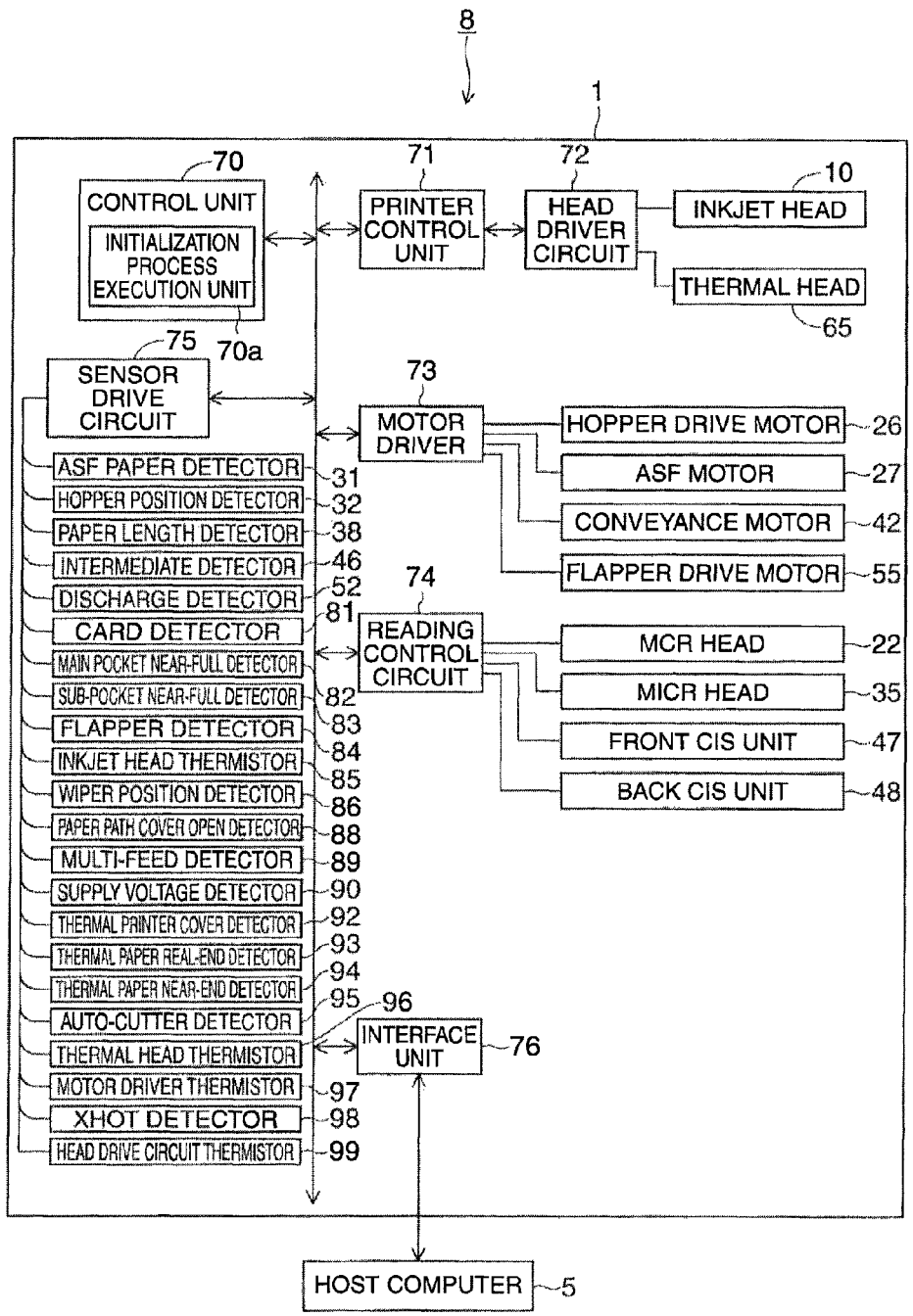
FIG. 3 is a block diagram showing the functional configuration of the multifunction device.

While not shown in FIG. 1 and FIG. 2, the multifunction device 1 also has a paper path cover open detector 88 that detects if the cover 12 is open or closed, a multi-feed detector 89 that detects multi-feeding of checks 4 on the conveyance path W, and a supply voltage detector 90 that detects abnormal voltage in the power supply not shown. All three detectors are shown in FIG. 3.

As shown in FIG. 1 and FIG. 2, a thermal printer unit 60 for printing tickets with an image recorded thereon is provided in the middle of the multifunction device 1.

A shown in FIG. 1, the thermal printer unit 60 has a printer cover 61 covering the top of the unit. This printer cover 61 is attached to the cover 12 so that the printer cover 61 can open and close freely. When the printer cover 61 is open, a roll paper compartment 62, which is a space for holding thermal roll paper, is exposed and the thermal roll paper can be installed or replaced. A paper exit 63 is formed in the printer cover 61, and the thermal roll paper held in the roll paper compartment 62 can be discharged through the paper exit 63.

The thermal printer unit 60 includes a roller platen (not shown in the figure) that supplies and feeds thermal roll paper from the roll paper compartment 62, a thermal head 65 (FIG. 3) disposed opposite the platen, and a cutter unit 66 that cuts the thermal roll paper perpendicularly to the conveyance direction. To produce a ticket, the thermal printer unit 60 records an image on the thermal roll paper with the thermal head 65 while driving the platen and conveying the thermal roll paper in the conveyance direction, and then cuts the thermal roll paper at a specific position with the cutter unit 66 to produce a ticket.

Also not shown in FIG. 1 and FIG. 2, the thermal printer unit 60 has a thermal printer cover detector 92 that detects if the printer cover 61 is open or closed; a thermal paper real-end detector 93 that detects the end (real end) of the thermal roll paper stored in the roll paper compartment 62; a thermal paper near-end detector 94 that detects when the end of the thermal roll paper is near (near-end); an auto-cutter detector 95 that detects whether or not the movable knife of the cutter unit 66 is in the standby position; and a thermal head thermistor 96 that detects if the temperature of the thermal head 65 is abnormal. Each of these detectors is also shown in FIG. 3.

FIG. 3 is a block diagram showing the functional configuration of a reading system 8 composed of the multifunction device 1 connected to a host computer 5 (control device).

The multifunction device 1 has a control unit 70 including a CPU that controls multifunction device 1 operation, RAM, and flash ROM; a printer control unit 71 that controls the inkjet printer unit 44 and thermal printer unit 60; and a head driver circuit 72, motor driver 73, reading control circuit 74, sensor drive circuit 75, and interface unit 76, which are connected so that they can communicate with each other.

The control unit 70 controls the other parts of the multifunction device 1 by means of the CPU reading and running a control program stored in flash ROM.

The printer control unit 71 supplies drive current to the inkjet head 10 through the head driver circuit 72 to record on a check 4 as controlled by the control unit 70. The printer control unit 71 also supplies drive current to the thermal head 65 through the head driver circuit 72 to record on thermal roll paper as controlled by the control unit 70.

In this embodiment of the invention the control unit 70 functions in conjunction with the printer control unit 71, head driver circuit 72, inkjet head 10, and other parts as a recording unit that records on media (checks 4) conveyed by the conveyance unit.

The motor driver 73 is connected to the hopper drive motor 26 and causes the hopper 25 to pivot as controlled by the control unit 70.

The motor driver 73 is connected to the ASF motor 27, conveyance motor 42, and flapper drive motor 55, outputs drive current and drive pulses to the motors, and operates the motors as controlled by the control unit 70.

In this embodiment, the motor driver 73, ASF motor 27, and conveyance motor 42 that are controlled by the control unit 70, the rollers that rotate with these motors, and other mechanisms work together and function as a conveyance unit that conveys check 4 media.

The reading control circuit 74 is connected to the MCR head 22, MICR head 35, front CIS unit 47, and back CIS unit 48.

The reading control circuit 74 causes the MCR head 22 to read the magnetic information when a card is swiped through the card slot 21 (FIG. 1), and digitizes and outputs the read signal output from the MCR head 22 to the control unit 70 as controlled by the control unit 70.

The reading control circuit 74 also reads magnetic information with the MICR head 35, and digitizes and outputs the read signal output from the MICR head 35 to the control unit 70 as controlled by the control unit 70.

The reading control circuit 74 also images the face 4a and back 4b of the check 4 with the front CIS unit 47 and back CIS unit 48 as controlled by the control unit 70, and digitizes and outputs the signals output from the front CIS unit 47 and back CIS unit 48 to the control unit 70.

In this embodiment of the invention the reading control circuit 74, MICR head 35, front CIS unit 47 and back CIS unit 48, and other parts controlled by the control unit 70 work together to function as a reading unit that reads information from media (checks 4) conveyed by the conveyance unit.

The sensor drive circuit 75 is connected to the ASF paper detector 31, hopper position detector 32, paper length detector 38, intermediate detector 46, discharge detector 52, card detector 81, main pocket near-full detector 82, sub-pocket near-full detector 83, flapper detector 84, inkjet head thermistor 85, wiper position detector 86, paper path cover open detector 88, multi-feed detector 89, supply voltage detector 90, thermal printer cover detector 92, thermal paper real-end detector 93, thermal paper near-end detector 94, auto-cutter detector 95, and thermal head thermistor 96, as described above. The sensor drive circuit 75 is also connected to a motor driver thermistor 97 that detects temperature abnormalities in the motor driver 73, a heat detector 98 that detects problems in the head driver circuit 72, and a head drive circuit thermistor 99 that detects temperature abnormalities in the head driver circuit 72. The sensor drive circuit 75 supplies current to these detectors, gets the output values therefrom at specific times, and digitizes and outputs the acquired detection signals to the control unit 70.

The interface unit 76 is connected to the host computer 5 by wire or wirelessly, and exchanges data, including control data, with the host computer 5 as controlled by the control unit 70. The control unit 70 and interface unit 76 together function as a reception unit.

Figure 4:
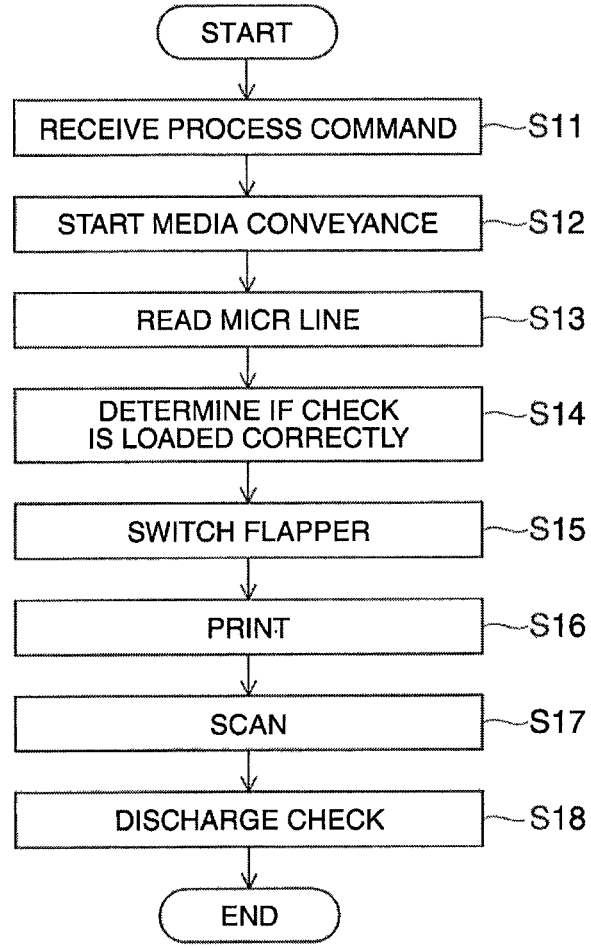
FIG. 4 is a flow chart of the operation of the multifunction device.

The basic operation of the multifunction device 1 when processing one check 4 is described next with reference to the flow chart in FIG. 4.

When a command to start processing a check 4 is received from the host computer 5 (step S11), the control unit 70 of the multifunction device 1 drives the hopper drive motor 26 and ASF motor 27 while monitoring the output values of the hopper position detector 32 and ASF paper detector 31, feeds a check 4 into the conveyance path W, and starts check 4 conveyance (step S12).

Next, the control unit 70 reads the MICR line 4*c* of the check 4 with the MICR head 35 while managing the position of the check 4 by monitoring the output from the paper length detector 38 (step S13).

Next, based on the output from the MICR head 35, the control unit 70 determines if the check 4 was loaded correctly instead of backwards top-bottom or front-back (step S14). More specifically, the control unit 70 applies magnetic ink character recognition to the magnetic ink characters in the MICR line 4*c* by comparing the waveforms obtained by reading the magnetic ink characters with standard waveforms, and determines if the check 4 was loaded correctly or not based on whether or not magnetic ink character recognition is successful.

Next, the control unit 70 drives the flapper drive motor 55 to switch the flapper 54 as required based on the result from step S14 (step S15). More specifically, if the check 4 was loaded correctly, the control unit 70 switches the flapper 54 to the main pocket 19*a* side, and if the check 4 was not loaded correctly, the control unit 70 switches the flapper 54 to the sub-pocket 19*b* side. Note that steps S14 and S15 could run parallel to steps S16 to S18 described below.

Next, the control unit 70 drives the rollers by driving the conveyance motor 42 to convey the check 4 while monitoring the position of the check 4 by monitoring output from the intermediate detector 46, and records a specific image on the back 4*b* of the check 4 with the inkjet head 10 (step S16). Note that if the check 4 was not loaded correctly, recording an image in step S16 may be skipped.

The control unit 70 then scans the face 4*a* of the check 4 with the front CIS unit 47 while scanning the back 4*b* with the back CIS unit 48 (step S17), and outputs the scanned images to the host computer 5. Note that if the check 4 was not loaded correctly, scanning in step S17 may be skipped.

The control unit 70 then drives the rollers by driving the conveyance motor 42 to discharge the check 4 into the exit pocket 19 while monitoring whether or not the check 4 was discharged correctly by monitoring the output of the discharge detector 52 (step S18). The check 4 is guided at this time by the flapper 54 into the appropriate exit pocket 19, that is, the main pocket 19*a* or sub-pocket 19*b*, based on the result of reading by the MICR head 35.

Operation of the multifunction device 1 after the power turns on or the device is reset is described next. A reset refers to reinitializing the multifunction device 1 when the multifunction device 1 power is on while keeping the power on, and the reset process can be started in this embodiment by inputting a reset command from the host computer 5. Operation is the same after a reset and after the power is turned on.

The operation of a conventional multifunction device as known from the related art is described first to show the problem with conventional devices. Note that when referring to parts of the conventional multifunction device, parts that are the same as parts in the multifunction device 1 according to this embodiment of the invention are referred to using the same reference numerals identifying parts in the multifunction device 1 according to the present invention.

Comparison

Figure 6:
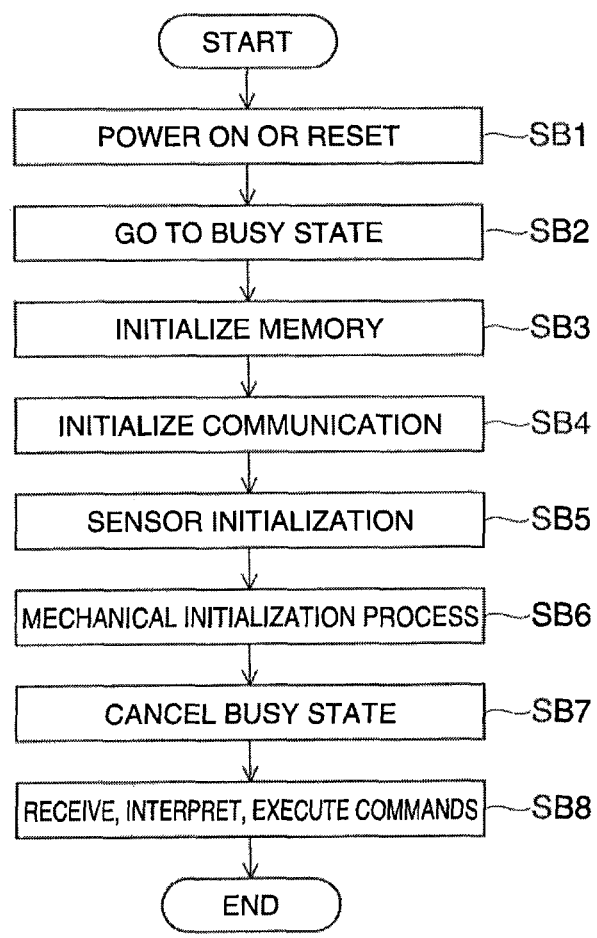
FIG. 6 is a flow chart of the operation of a multifunction device according to the related art.

FIG. 6 is a flow chart of the operation of a conventional multifunction device after the power turns on and after a reset.

When the power turns on or a reset command is received (step SB1), the conventional multifunction device first enters a busy state (step SB2).

A busy state refers to a state in which no commands from the host computer 5 can be received. While the multifunction device is busy, the host computer 5 delays sending commands to the multi function device. When the busy state is cancelled, the host computer 5 sends the commands for which transmission was delayed to the multifunction device 1, and these commands are stored in the receive buffer of the multifunction device 1. Receiving commands from the host computer 5 can also be stopped by interrupting communication with the host computer 5 while the multifunction device is busy.

The conventional multifunction device then initializes its memory as required (step SB3). For example, the conventional multifunction device deletes data from specific areas in buffer memory, including the receive buffer that temporarily stores commands input from the host computer 5 and the image buffer where image data for the images to be recorded by the inkjet head 10 or thermal head 65 are stored, RAM, EEPROM, and other memory devices so that the memory devices are ready for use.

The conventional multifunction device then runs a communications initialization process (step SB4). This communication initialization process initializes the software and hardware interface between the control unit 70 and the network card of the interface unit 76, and initializes the communication control chip of the network card, to enable normal communication with the host computer 5.

The conventional multifunction device then initializes the sensors and checks for sensor problems (step SB5). More specifically, the conventional multifunction device initializes and energizes the ASF paper detector 31, hopper position detector 32, paper length detector 38, intermediate detector 46, discharge detector 52, card detector 81, main pocket near-full detector 82, sub-pocket near-full detector 83, flapper detector 84, inkjet head thermistor 85, wiper position detector 86, paper path cover open detector 88, multi-feed detector 89, supply voltage detector 90, thermal printer cover detector 92, thermal paper real-end detector 93, thermal paper near-end detector 94, auto-cutter detector 95, thermal head thermistor 96, motor driver thermistor 97, XHOT detector 98, and head drive circuit thermistor 99 so that the output values can be acquired therefrom. The conventional multifunction device detects problems with the sensors by checking if output can be acquired from each sensor, or by checking if the output values acquired from specific sensors are within predetermined ranges.

If a problem is detected with any sensor in step SB5, the conventional multifunction device reports the problem to the host computer 5 and stops operation without proceeding to step SB6. Based on this report, the host computer 5 reports the error to the user by displaying an appropriate message on a display panel, for example.

After the sensor problem is corrected, the power is turned on again or the system is reset, and a sensor problem is not detected in step SB5, the conventional multifunction device proceeds to step SB6.

Note that if the multifunction device has LEDs or a display panel for reporting errors and the device state, the user could be informed using the LED or display panel in addition to or instead of sending the report to the host computer 5.

In step SB6 the conventional multifunction device runs a mechanical initialization process (step SB6).

All mechanical initialization processes that are predefined as processes that must be executed after the multifunction device turns on or resets are run in step SB6. There are at least two mechanical initialization processes that must be executed, an initial operation failure detection process, and an inkjet head setup process.

The initial operation failure detection process is a process that checks whether or not mechanical systems including at least the conveyance unit, reading unit, and recording unit are operating normally. For example, the motors are driven a specific amount through the motor driver 73 to check if initial operation of the motors is normal, and whether or not a check 4 was left in the conveyance path W is checked based on the output values of sensors disposed along the conveyance path W. This initial operation failure detection process detects problems with the initial operation of all predetermined mechanical systems.

If an initial operation failure is detected in any mechanical system in the initial operation failure detection process, the conventional multifunction device reports the problem to the host computer 5, and stops operation without proceeding to step SB7.

After the problem is corrected, the power is turned on again or the system is reset, and an initial operation failure is not detected in step SB6, the conventional multifunction device proceeds to step SB7.

The inkjet head setup process that is included in the mechanical initialization processes is a process related to preparations required for the inkjet head 10 to eject ink normally.

More specifically, the inkjet head setup process includes a process that suctions ink left in the cap ("ink suction process" below). In this embodiment ink that is ejected from the nozzles of the inkjet head 10 in the cleaning and flushing operations is temporarily stored in the cap, and is then discharged into a waste ink tank provided in the ink cartridge 45 by driving a pump not shown. The suction process includes a process that forcibly transfers ink left in the cap to the waste ink tank by driving the pump. The ink suction process is always run after the power turns on and after a reset in order to prevent ink from overflowing the cap.

A timer cleaning operation is also included in the inkjet head setup process. The timer cleaning operation is performed when the time since the last time the inkjet head 10 was used exceeds a preset long time (such as plural months). The multifunction device 1 manages the time since the last time the inkjet head 10 was used, and runs the timer cleaning process if this elapsed time exceeds the preset time when the power is turned on or a reset occurs.

A special cleaning operation is also included in the inkjet head setup process. The special cleaning operation is performed the next time the power turns on after the power goes off with the inkjet head 10 cap open, that is, after the power turns off with the inkjet head 10 uncapped. When the power turns off normally, the inkjet head 10 is covered by the cap, thereby inhibiting ink left in the nozzles from drying (increasing in viscosity). However, if the power goes off unconditionally due to an error or power failure, for example, the power supply could shut down without the inkjet head 10 being capped. When this happens, cleaning is required the next time the power turns on to expel any ink that has increased in viscosity from the nozzles. As a result, the conventional multifunction device determines if the inkjet head 10 is capped after the power turns on, and if not (that is, the power supply shut down the last time with the inkjet head 10 not capped), executes the special cleaning process.

In initial charging process is also included in the inkjet head setup process. The initial charging process is a process that charges the nozzles of the inkjet head 10 with ink the first time the multifunction device is set up and turned on after shipping from the factory.

After the mechanical initialization process in step SB6, the conventional multifunction device cancels the busy state and starts accepting commands from the host computer 5 (step SB7).

When a command is input from the host computer 5 after the busy state is cancelled, the conventional multifunction device interprets the command and runs the specific process instructed by the command (step SB8).

The conventional multifunction device thus cancels the busy state after completing all predetermined initialization processes in the mechanical initialization process in step SB6. While a benefit of this conventional configuration is that commands from the host computer 5 are received after confirming that all operations related to media processing can be performed, this also increases the time from when the busy state starts to when the busy state is cancelled.

Because the time when the multifunction device is in this busy state is an unnecessary period during which the host computer cannot request a response from or control the multifunction device, shortening this period as much as possible is desirable. The multifunction device 1 according to the invention therefore operates as described below.

Description of Preferred Embodiment

Figure 5:
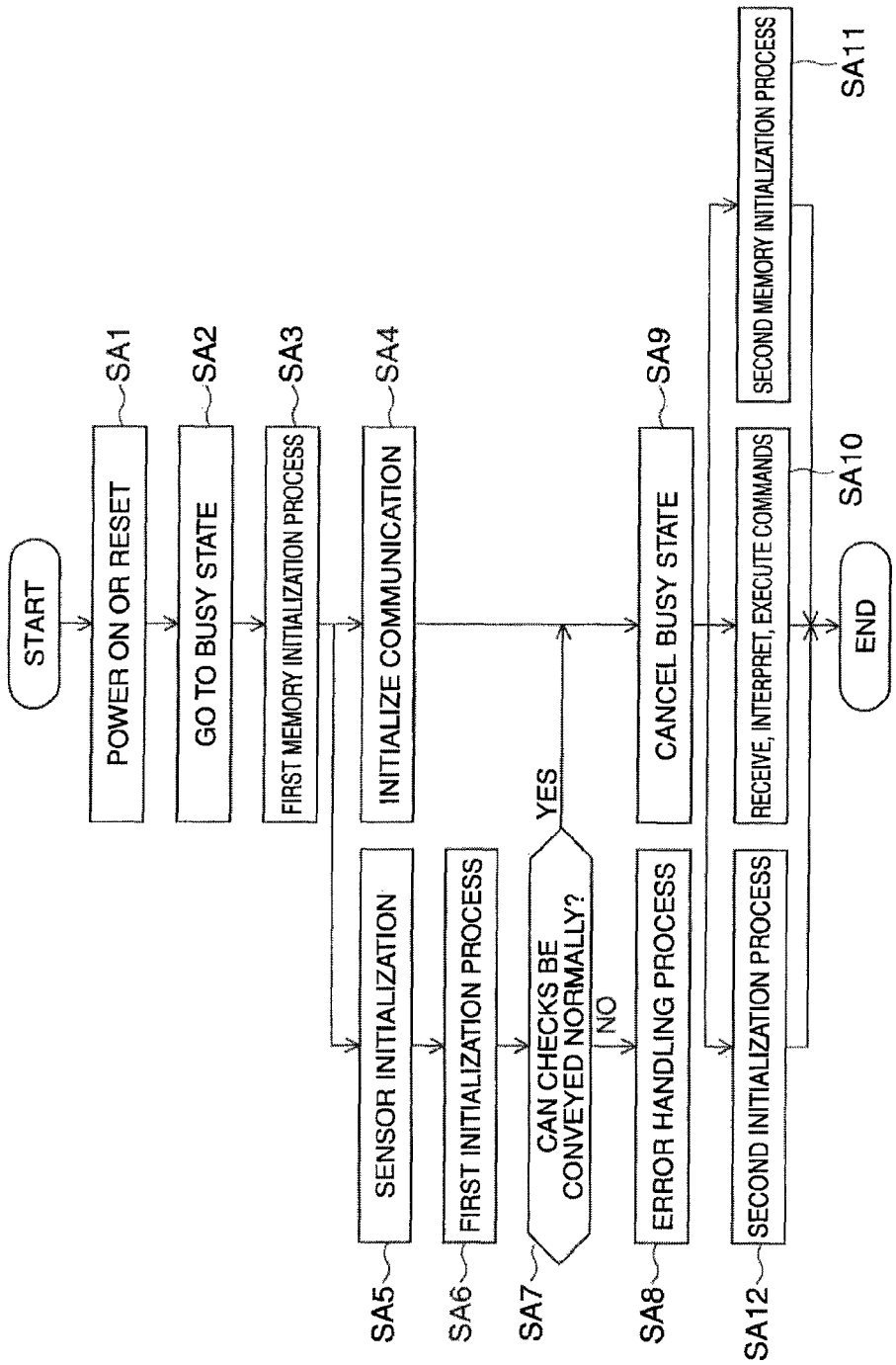
FIG. 5 is a flow chart of the operation of the multifunction device.

FIG. 5 is a flow chart of the operation of a multifunction device 1 according to a preferred embodiment of the invention.

After the device turns on or resets (step SA1), the initialization process execution unit 70*a* of the control unit 70 of the multifunction device 1 enters a busy state and stops receiving commands from the host computer 5 (step SA2). The function of this initialization process execution unit 70*a* is achieved by the cooperation of hardware and software, such as a CPU reading and running a firmware.

Next, the initialization process execution unit 70*a* executes a first memory initialization process (step SA3). This first memory initialization process is a memory initialization process required to run the first initialization process in step SA6 described below. A specific example of the first memory initialization process is described below in conjunction with the first initialization process of step SA6.

Next, the initialization process execution unit 70*a* runs a communications initialization process (step SA4). This step SA4 is the same as step SB4 in FIG. 6.

Parallel to the communication initialization process in step SA4, the initialization process execution unit 70*a* initializes the sensors and checks for sensor problems (step SA5). This step SA5 is the same as step SB5 in FIG. 6. As a result, if a problem is found with any sensor, the initialization process execution unit 70*a* reports the problem to the host computer 5 and stops operation without proceeding to step SA6.

After the sensor problem is then corrected, the power is turned on again or the system is reset, and a sensor problem is not detected in step SA5, the initialization process execution unit 70*a* proceeds to step SA6.

If the sensors are initialized in step SA5 and a sensor problem is not found, the initialization process execution unit 70*a* executes the first initialization process (step SA6). This first initialization process can run parallel to the communication initialization process in step SA4.

This first initialization process is described next.

The first initialization process is an initialization process included in the mechanical initialization processes described in step SB6 in FIG. 6 related to checking if the conveyance unit can convey checks 4 normally. More specifically, based on the output from the paper length detector 38, intermediate detector 46, discharge detector 52, and multi-feed detector 89, the initialization process execution unit 70a determines if a check 4 or other media remains in the conveyance path W. The initialization process execution unit 70a also controls the motor driver 73 to drive the motors related to check 4 conveyance, including the hopper drive motor 26, ASF motor 27, and conveyance motor 42, a specific amount, and detects if the motors that convey the media can be driven normally. Other necessary operations are also executed to check whether or not the entire media conveyance operation whereby a check 4 stored in the stacker 15 is conveyed through the conveyance path W and discharged into the exit pocket 19 runs normally.

Note that the first memory initialization process in step SA3 initializes the memory storage areas that store the output values of the conveyance-related sensors, including the paper length detector 38, intermediate detector 46, discharge detector 52, and multi-feed detector 89. The first memory initialization process also initializes the memory storage areas that store variables for managing driving the motors related to check 4 conveyance, including the hopper drive motor 26, ASF motor 27, and conveyance motor 42. In other words, the first memory initialization process initializes the memory areas required for the first initialization process in step SA6.

The communication initialization process in step SA4, the sensor initialization process in step SA5, and the first initialization process in step SA6 can run in parallel because they address different software and hardware elements. Furthermore, because the communication initialization process in step SA4, the sensor initialization process in step SA5, and the first initialization process in step SA6 can run in parallel, processing efficiency is improved compared with when these processes run sequentially independently, and the time from entering to cancelling the busy state can therefore be shortened.

After the first initialization process ends, the initialization process execution unit 70a determines if checks 4 can be conveyed normally by the conveyance unit (step SA7), and if a check 4 cannot be conveyed normally (step SA7 returns No), the initialization process execution unit 70a runs an error handling process (step SA8). This error handling process reports to the host computer 5 that the conveyance unit cannot convey checks 4 normally, and stops further operation.

However, if the conveyance unit can convey checks 4 normally (step SA7 returns Yes) and the communication initialization process of step SA4 has ended, the initialization process execution unit 70a cancels the busy state (step SA9), and starts accepting commands from the host computer 5.

As described above, instead of running all mechanical initialization processes before cancelling the busy state, this embodiment of the invention runs at least the initialization process related to checking if a check 4 can be conveyed normally by the conveyance unit, and cancels the busy state if normal conveyance is possible. The effect of this is described below.

If media cannot be conveyed normally by the conveyance unit after the device turns on or resets because media remains in the conveyance path W or there is an error with the conveyance mechanism, the conveyance operation that is essential to processing checks 4, including reading information from checks 4 with the CIS unit (reading unit) and recording on checks 4 with the inkjet head 10, is not possible. Checks 4 can therefore not be processed in any way, and the error preventing media conveyance must be resolved immediately without starting to receive commands from the host computer 5. Media conveyance errors are commonly errors resulting from media remaining in the conveyance path W, such errors can be readily corrected, the time required to correct the error is short, and convenience often does not suffer.

However, errors related to the CIS unit or the inkjet head 10 can also occur while media can be normally conveyed by the conveyance unit. This includes cases in which prompt correction of the error is not necessary, such as when the user knows and does not mind that the check 4 information cannot be read with the CIS unit, or knows and does not mind that images cannot be recorded with the inkjet head 10. In such cases, receiving commands from the control device and processing commands that can be processed is possible.

This embodiment of the invention therefore runs at least the initialization process related to checking if checks 4 can be conveyed normally by the conveyance unit before cancelling the busy state. Because the busy state is cancelled when normal conveyance is possible, the ability to convey media normally with the conveyance unit is assured. The time required for the first initialization process is therefore shorter after stopping receiving commands from the host computer 5 until confirming there are no errors related to media processing, and the length of the busy period can be shortened.

When a command is input from the host computer 5 after the busy state is cancelled, the control unit 70 of the multifunction device 1 interprets the command and runs the specific process instructed by the command (step SA10).

Parallel to command processing in step SA10, the initialization process execution unit 70a runs a second memory initialization process (step SA11) and second initialization process (step SA12).

Processes based on received commands include, for example, responding to status requests from the host computer 5 and storing specific data in specific memory areas, and can be executed parallel to the second memory initialization process and second initialization process described below. As a result, the second memory initialization process (step SA11) and second initialization process (step SA12) can run parallel to the process based on a received command in step SA10 in this embodiment, and processing efficiency improves.

Note that the commands input from the host computer 5 may include a command that cannot be executed in parallel with the second memory initialization process and second initialization process. When this happens, operation may be delayed until execution is possible, or a different command that can be executed could be executed first.

A memory initialization process that was not executed in the first memory initialization process in step SA3 is executed in the second memory initialization process in step SA11.

This embodiment of the invention thus divides the process related to memory initialization into a first memory initialization process that is run before cancelling the busy state, and a second memory initialization process that is run after cancelling the busy state. Because the first memory initialization process initializes the memory that is required for the first initialization process in step SA6, and the second memory initialization process runs the remaining processes, the time required for the memory initialization process that must be run before cancelling the busy state is shorter than in the related art, and the time spent in the busy state can be further shortened.

The second initialization process in step SA12 runs the mechanical initialization processes that were not executed in the first initialization process in step SA6. The second initialization process therefore includes initialization of the recording unit (including the printer control unit 71, head driver circuit 72, and inkjet head 10), and the reading unit (including the reading control circuit 74, MICR head 35, front CIS unit 47 and back CIS unit 48), and the recording unit initialization operation includes the inkjet head setup process described above.

The inkjet head setup process includes the suction process as described above, and one or more of the timer cleaning, special cleaning, and initial charging processes as required. These processes involve operating the inkjet head 10 and other physical mechanisms (such as the pump), and require a relatively long time. However, because the inkjet head setup process is an, initialization process that is required to ensure that images can be recorded normally and is run regularly instead of when an error occurs, receiving a command from the host computer 5 before the process is completed will not directly create any problem. Furthermore, because the inkjet head setup process is part of the second initialization process, the time required for the first initialization process that runs before cancelling the busy state can be greatly shortened, and the time spent in the busy state can be shortened dramatically.

As described above, the initialization process execution unit 70a of the control unit 70 of the multifunction device 1 (media processing device) according to this embodiment of the invention enters a busy state after the power turns on or the device resets, runs a first initialization process including at least confirming that checks 4 can be conveyed normally by the conveyance unit, and then cancels the busy state and runs a second initialization process that completes device initialization.

The initialization process that must be run after device power turns on or the device is reset is thus divided into a first initialization process and a second initialization process, the busy state is cancelled after confirming that the conveyance unit can normally convey checks 4 in the first initialization process, and the remaining initialization processes are run in the second initialization process. As a result, the period during which commands are not received from the host computer 5 after the power turns on or a reset can be shortened as much as possible after desirably preventing receiving commands from the host computer 5 until confirming that checks 4 can be conveyed normally by the conveyance unit and there are no errors related to media processing.

The multifunction device 1 according to this embodiment of the invention records on checks 4 with the inkjet head 10, and the initialization process execution unit 70a runs an inkjet head setup process in the second initialization process.

As described above, the inkjet head setup process includes the suction process, and one or more of the timer cleaning, special cleaning, and initial charging processes as required. These processes involve operating the inkjet head 10 and other physical mechanisms (such as the pump), and require a relatively long time. However, because the inkjet head setup process is an initialization process that is required to ensure that images can be recorded normally and is run regularly instead of when an error occurs, receiving a command from the host computer 5 before the process is completed will not directly create any problem.

As a result, because the inkjet head setup process is run as part of the second initialization process after cancelling the busy state, the time for which commands are not received from the host computer 5 after a reset or the power turns on can be shortened as much as possible.

The inkjet head setup process in this embodiment includes at least a suction process.

Because the suction process is required after the device power turns on or a reset as described above, and involves moving the inkjet head 10 and driving a pump, it requires a relatively long time.

Therefore, by running the suction process in the second initialization process after cancelling the busy state, the time for which commands are not received from the control device after a reset or the power turns on can be shortened as much as possible.

In this embodiment the second initialization process of the initialization process execution unit 70a and the process related to receiving commands from the host computer 5 (interpreting and running commands input from the host computer 5) run in parallel after cancelling the busy state.

Processing efficiency can thus be further improved by running the second initialization process and the process related to receiving commands in parallel.

The invention is described above with reference to a preferred embodiment of the invention, but the invention is not so limited and can be modified and adapted in many ways without departing from the scope of the accompanying claims.

For example, the multifunction device 1 in the foregoing embodiment has the MICR head 35, inkjet head 10, and CIS unit disposed in sequence along the conveyance path W, but the order of these devices and the specific configuration of the multifunction device 1 is not so limited. More specifically, the invention can be widely applied to media processing devices having a conveyance unit that conveys media, a reading unit that reads information from the media conveyed by the conveyance unit, and a recording unit that records on the media conveyed by the conveyance unit.

The function blocks shown in FIG. 3 can be rendered through the cooperation of software and hardware, and do not suggest a specific hardware configuration.

The function of the control unit 70, for example, can also be provided by a separate device externally connected to the multifunction device 1.

The steps in the flow chart shown in FIG. 5 can also be executed by executing a program stored to an externally connected recording medium.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The entire disclosure of Japanese Patent Application No: 2011-201881, filed Sep. 15, 2011 is expressly incorporated by reference herein.

TEXT IN THE FIGURES

FIG. 3

CONTROL UNIT 70
INITIALIZATION PROCESS EXECUTION UNIT 70a
SENSOR DRIVE CIRCUIT 75
ASF PAPER DETECTOR 31
HOPPER POSITION DETECTOR 32
PAPER LENGTH DETECTOR 38

INTERMEDIATE DETECTOR 46
DISCHARGE DETECTOR 52
CARD DETECTOR 81
MAIN POCKET NEAR-FULL DETECTOR 82
SUB-POCKET NEAR-FULL DETECTOR 83
FLAPPER DETECTOR 84
INKJET HEAD THERMISTOR 85
WIPER POSITION DETECTOR 86
PAPER PATH COVER OPEN DETECTOR 88
MULTI-FEED DETECTOR 89
SUPPLY VOLTAGE DETECTOR 90
THERMAL PRINTER COVER DETECTOR 92
THERMAL PAPER REAL-END DETECTOR 93
THERMAL PAPER NEAR-END DETECTOR 94
AUTO-CUTTER DETECTOR 95
THERMAL HEAD THERMISTOR 96
MOTOR DRIVER THERMISTOR 97
XHOT DETECTOR 98
HEAD DRIVE CIRCUIT THERMISTOR 99
PRINTER CONTROL UNIT 71
HEAD DRIVER CIRCUIT 72
MOTOR DRIVER 73
READING CONTROL CIRCUIT 74
INTERFACE UNIT 76
INKJET HEAD 10
THERMAL HEAD 65
HOPPER DRIVE MOTOR 26
ASF MOTOR 27
CONVEYANCE MOTOR 42
FLAPPER DRIVE MOTOR 55
MCR HEAD 22
MICR HEAD 35
FRONT CIS UNIT 47
BACK CIS UNIT 48

FIG. 4

Start
S11 RECEIVE PROCESS COMMAND
S12 START MEDIA CONVEYANCE
S13 READ MICR LINE
S14 DETERMINE IF CHECK IS LOADED CORRECTLY
S15 SWITCH FLAPPER
S16 PRINT
S17 SCAN
S18 DISCHARGE CHECK
End

FIG. 5

Start
SA1 POWER ON OR RESET
SA2 GO TO BUSY STATE
SA3 FIRST MEMORY INITIALIZATION PROCESS
SA4 INITIALIZE COMMUNICATION
SA5 SENSOR INITIALIZATION
SA6 FIRST INITIALIZATION PROCESS
SA7 CAN CHECKS BE CONVEYED NORMALLY?
SA8 ERROR HANDLING PROCESS
SA9 CANCEL BUSY STATE
SA10 RECEIVE, INTERPRET, EXECUTE COMMANDS
SA11 SECOND MEMORY INITIALIZATION PROCESS
SA12 SECOND INITIALIZATION PROCESS
End

FIG. 6

Start
SB1 POWER ON OR RESET
SB2 GO TO BUSY STATE
SB3 INITIALIZE MEMORY
SB4 INITIALIZE COMMUNICATION
SB5 SENSOR INITIALIZATION
SB6 MECHANICAL INITIALIZATION PROCESS
SB7 CANCEL BUSY STATE
SB8 RECEIVE, INTERPRET, EXECUTE COMMANDS
End

What is claimed is:

1. A media processing device comprising:
a reception unit that receives commands;
a conveyance unit that conveys media;
a reading unit that reads information from the media conveyed by the conveyance unit;
a recording unit that records on the media conveyed by the conveyance unit; and
an initialization process execution unit that, after the media processing device turns on or resets, enters a busy state in which the reception unit does not receive commands, executes a first initialization process that runs a process confirming whether or not media can be conveyed by the conveyance unit, and then cancels the busy state and runs a second initialization process that initializes the recording unit or the reading unit.

2. The media processing device described in claim 1, wherein:
the recording unit records on the media with an inkjet head; and
a recording unit initialization operation of the second initialization process is a process related to preparing the inkjet head for ink ejection.

3. The media processing device described in claim 2, wherein:
the process related to preparing the inkjet head for ink ejection is a process related to suctioning ink from a cap of the inkjet head.

4. The media processing device described in claim 1, wherein:
after cancelling the busy state, a process related to the reception unit receiving the commands is executed while the initialization process execution unit runs the second initialization process.

5. A method of controlling a media processing device comprising steps of:
turning media processing device power on or resetting the media processing device;
entering a busy state in which a reception unit does not receive commands;
executing a first initialization process that confirms whether or not media can be conveyed by a conveyance unit that conveys media;
canceling the busy state after running the first initialization process; and
running a second initialization process that initializes a recording unit that records on the media or a reading unit that reads information from the media.

6. The method of controlling a media processing device described in claim 5, wherein:
an initialization operation of the second initialization process is a process related to preparing for ejecting ink by an inkjet head of the recording unit.

7. The method of controlling a media processing device described in claim 5, wherein:

after cancelling the busy state, a process related to the reception unit receiving commands is executed while executing the second initialization process.

* * * * *